(12) United States Patent
Zarfos

(10) Patent No.: US 10,225,891 B2
(45) Date of Patent: Mar. 5, 2019

(54) IN-SITU INDUCTION CURED RADIUS FILLER

(71) Applicant: The Boeing Company, Chicago, IL (US)

(72) Inventor: Joshua William Zarfos, Renton, WA (US)

(73) Assignee: The Boeing Company, Chicago, IL (US)

(*) Notice: Subject to any disclaimer, the term of this patent is extended or adjusted under 35 U.S.C. 154(b) by 866 days.

(21) Appl. No.: 14/326,732

(22) Filed: Jul. 9, 2014

(65) Prior Publication Data

US 2016/0009035 A1 Jan. 14, 2016

(51) Int. Cl.
*H05B 6/10* (2006.01)
*B21D 53/88* (2006.01)
*B32B 37/24* (2006.01)
*B32B 37/06* (2006.01)
*B32B 38/00* (2006.01)
*B32B 37/10* (2006.01)
*B29C 70/44* (2006.01)
(Continued)

(52) U.S. Cl.
CPC ......... *H05B 6/106* (2013.01); *B29C 35/0272* (2013.01); *B29C 35/0805* (2013.01); *B29C 70/446* (2013.01); *B29D 99/0014* (2013.01); *B32B 37/06* (2013.01); *B32B 37/1018* (2013.01); *B32B 37/24* (2013.01); *B32B 38/0008* (2013.01); *B29C 2035/0811* (2013.01); *B29L 2031/3076* (2013.01); *B32B 2605/18* (2013.01)

(58) Field of Classification Search
CPC ......... B29C 2035/0811; B29C 35/0272; B29C 70/446; B29C 35/0805; B29D 99/0014; B29L 2031/3075; B29L 2031/3076; H05B 6/106; B23B 37/24; B23B 37/06; B23B 37/1018; B32B 38/0008; B32B 2605/18
USPC ....... 219/634, 243, 200–202, 213, 385, 438, 219/441–442, 476–478, 538–539, 544; 244/132–133; 156/182; 29/897.2
See application file for complete search history.

(56) References Cited

U.S. PATENT DOCUMENTS 5,087,804 A * 2/1992 McGaffigan ........... H05B 6/106
219/618
6,562,436 B2 5/2003 George et al.
(Continued)

FOREIGN PATENT DOCUMENTS

EP 2610165 A1 7/2013
EP 2695714 A2 2/2014
(Continued)

OTHER PUBLICATIONS

Japanese to English machine translation of JP 10-128764.*
Extended European Search Report, dated Jan. 11, 2016, regarding Application No. EP15171837.6, 8 pages.

*Primary Examiner* — Michael G Hoang
(74) *Attorney, Agent, or Firm* — Yee & Associates, P.C.

(57) ABSTRACT

A method for manufacturing a radius filler. The radius filler having a desired cross-sectional shape is formed. The radius filler has a composite material and a number of heating elements located within the composite material. The radius filler is positioned in a channel formed by a plurality of composite structures. The radius filler is inductively heated by inducing a current within the number of heating elements.

26 Claims, 14 Drawing Sheets

(51) Int. Cl.
  *B29C 35/02*    (2006.01)
  *B29D 99/00*    (2010.01)
  *B29L 31/30*    (2006.01)
  *B29C 35/08*    (2006.01)

(56) References Cited

U.S. PATENT DOCUMENTS

| | | |
|---|---|---|
| 7,758,715 B2 | 7/2010 | Peterson et al. |
| 8,454,340 B1* | 6/2013 | Loveless ............... B29C 71/02 |
| | | 219/535 |
| 2005/0133149 A1 | 6/2005 | Sieverding et al. |
| 2005/0230552 A1* | 10/2005 | Engwall ............... B29C 33/485 |
| | | 244/133 |
| 2008/0302912 A1* | 12/2008 | Yip ..................... B29C 43/10 |
| | | 244/119 |
| 2010/0133261 A1* | 6/2010 | Schildt ................ H05B 6/105 |
| | | 219/635 |
| 2012/0196083 A1 | 8/2012 | Hanawa et al. |
| 2013/0273264 A1 | 10/2013 | Mourou et al. |
| 2014/0034236 A1 | 2/2014 | Guzman et al. |

FOREIGN PATENT DOCUMENTS

| | | |
|---|---|---|
| EP | 2902179 A2 | 8/2015 |
| JP | 3310558 B2 | 8/2002 |

\* cited by examiner

IN-SITU INDUCTION CURED RADIUS FILLER

BACKGROUND INFORMATION

1. Field

The present disclosure generally relates to composite structures and, in particular, to the formation of composite structures. Still more particularly, the present disclosure relates to a method and apparatus for producing radius fillers used to fill channels between composite structures.

2. Background

Composite materials are tough, lightweight materials created by combining two or more functional components. For example, a composite material may include reinforcing fibers bound in a polymer resin matrix. The fibers may be unidirectional or may take the form of a woven cloth or fabric. The fibers may be pre-impregnated in a layer of resin, producing a ply of prepreg. In thermoset composites, separate fibers and resins, or prepreg sheets, are arranged and cured to form a structural member.

When composite structural members are joined together, channels or voids may be present between the members. These channels are filled in order to increase the strength of the structural member. For example, in the aircraft industry, some composite stiffeners include a filler at the radius bond line between the stiffener and a skin panel. As an example, a filler may be used at the radius bond line between a stringer and a skin panel.

In some cases, the filler takes the form of a triangular cross-sectional structure which fills the voids between the members. This triangular cross-sectional structure is sometimes referred to as a "radius filler," a "noodle," or a "composite filler."

A radius filler may be formed from composite materials such as adhesive, prepreg tape, fabric, or other types of composite materials. When the filler has a desired level of stiffness, the filler transfers some of the load from the stiffener into the base.

Oftentimes, a radius filler is co-cured with the surrounding composite lamina. In this process, the filler is pre-formed with a desired cross-sectional shape, placed within the channel between structures, and then cured with the surrounding structures. The process of co-curing the radius filler with the surrounding composite lamina causes stresses within the radius filler. In particular, these stresses occur within the radius filler as elements of the part heat up and expand, and following curing, those elements cool down and compress at different rates. For instance, as the surrounding structures cure, those structures serve as a stiff boundary condition for the filler. As a result, the radius filler experiences thermal cure induced stress, which increases a propensity for cracking within the filler.

In some cases, pre-cured radius fillers may be used to reduce the occurrence of thermal induced stresses. With pre-cured radius fillers, the filler is cured, subsequently placed into the channel between structures, and then bonded with the structures as they cure. Using pre-cured radius fillers, however, may add additional time and complexity to the manufacturing process. For example, pre-cured radius fillers may need to be bonded along complicated interfaces or may not have a desired cross-sectional shape. In addition, adding manufacturing steps by pre-curing the filler is not conducive to faster production cycles.

Therefore, it would be desirable to have a method and apparatus that take into account at least some of the issues discussed above, as well as other possible issues. Specifically, one issue is finding a method for curing fillers to reduce thermal induced stresses from co-curing processes.

SUMMARY

In one illustrative embodiment, a method for manufacturing a radius filler is provided. The radius filler having a desired cross-sectional shape is formed. The radius filler has a composite material and a number of heating elements located within the composite material. The radius filler is positioned in a channel formed by a plurality of composite structures. The radius filler is inductively heated by inducing a current within the number of heating elements.

In another illustrative embodiment, an apparatus comprises a radius filler having a desired cross-sectional shape. The radius filler has a composite material and a number of heating elements located within the composite material. The radius filler is cured by inductively heating the number of heating elements within the radius filler.

In yet another illustrative embodiment, a method for manufacturing an aircraft structure having a radius filler is presented. A plurality of composite structures is positioned relative to one another such that a channel is formed between the plurality of composite structures. A radius filler having a desired cross-sectional shape is formed. The radius filler has a composite material and a number of heating elements located within the composite material. The radius filler is positioned in the channel formed by the plurality of composite structures. The radius filler is inductively heated by inducing a current within the number of heating elements. The radius filler is cured using the heat generated from the current. The radius filler is cured prior to curing the plurality of composite structures. The plurality of composite structures is then cured around the radius filler to form the aircraft structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to reduce the risk of cracking within a radius filler. The illustrative embodiments recognize and take into account that some currently used co-curing methods increase the risk of cracking by increasing thermal induced stresses within the filler.

The illustrative embodiments further recognize and take into account that reducing thermal induced stresses within the filler from curing may improve structural performance. For example, the strength of co-cured laminates may be increased by reducing or eliminating radius filler cracking and stresses within the filler caused by curing processes.

Thus, the illustrative embodiments provide a method and apparatus for manufacturing a radius filler. Specifically, the illustrative embodiments provide a method to inductively cure the radius filler while in position between composite structures. The radius filler is formed having a desired cross-sectional shape. The radius filler has a composite material and a number of heating elements located within the composite material. The shaped radius filler is positioned in a channel formed by a plurality of composite structures. The radius filler is inductively heated by inducing a current within the number of heating elements. The heat generated by the number of heating elements cures the radius filler, prior to curing the surrounding composite structures.

Figure 1:
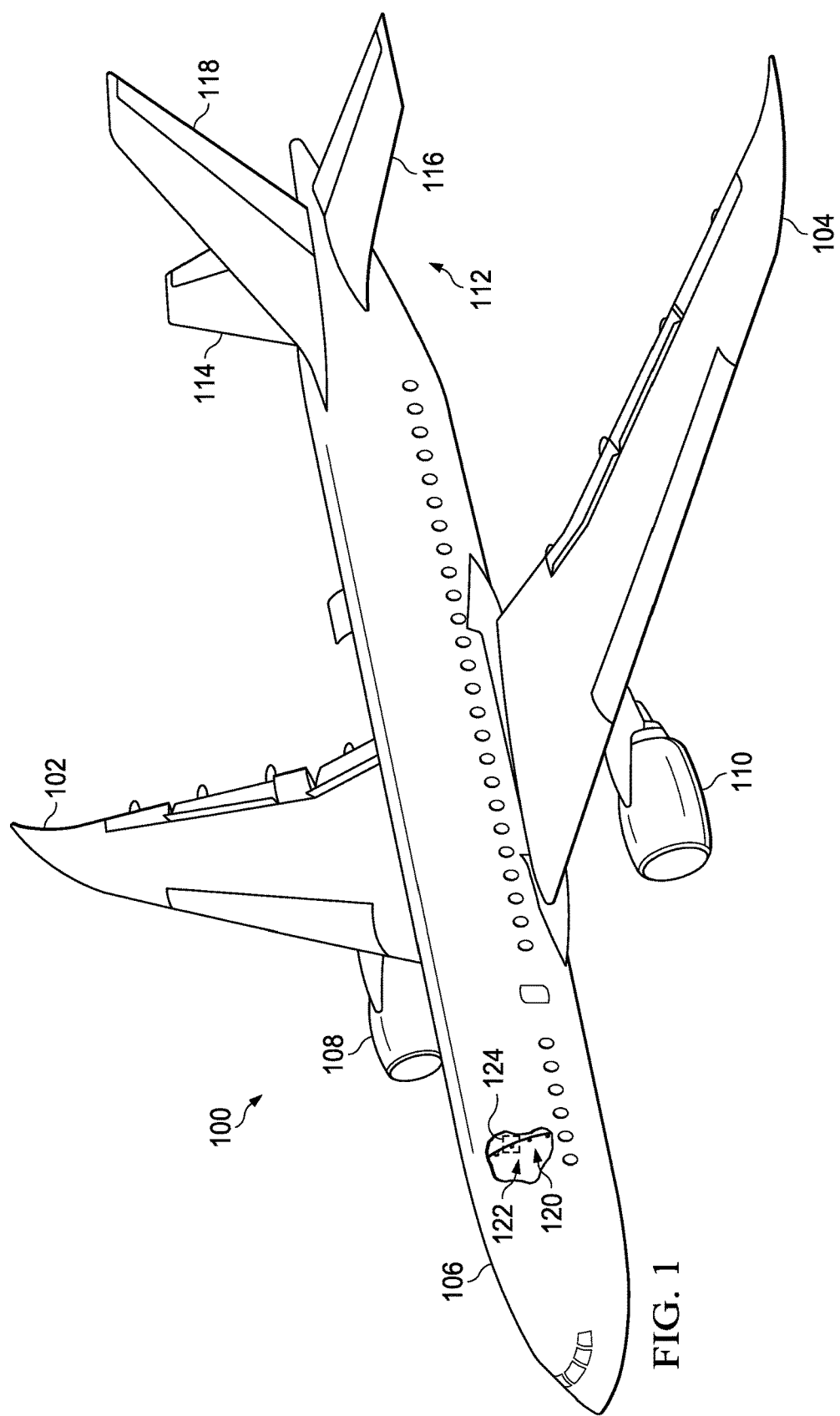
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of an aircraft in which radius fillers may be used in accordance with an illustrative embodiment. In this illustrative example, radius fillers may be used to fill channels between structures in aircraft 100. For example, an exposed interior view of fuselage 106 is shown with stringers 120.

Radius fillers 122 may be located in stringers 120. In some illustrative examples, radius fillers 122 may be referred to as composite fillers, noodles, composite noodles, or fillers. A portion of stringers 120 with radius fillers 122 is shown in section 124.

Figure 2:
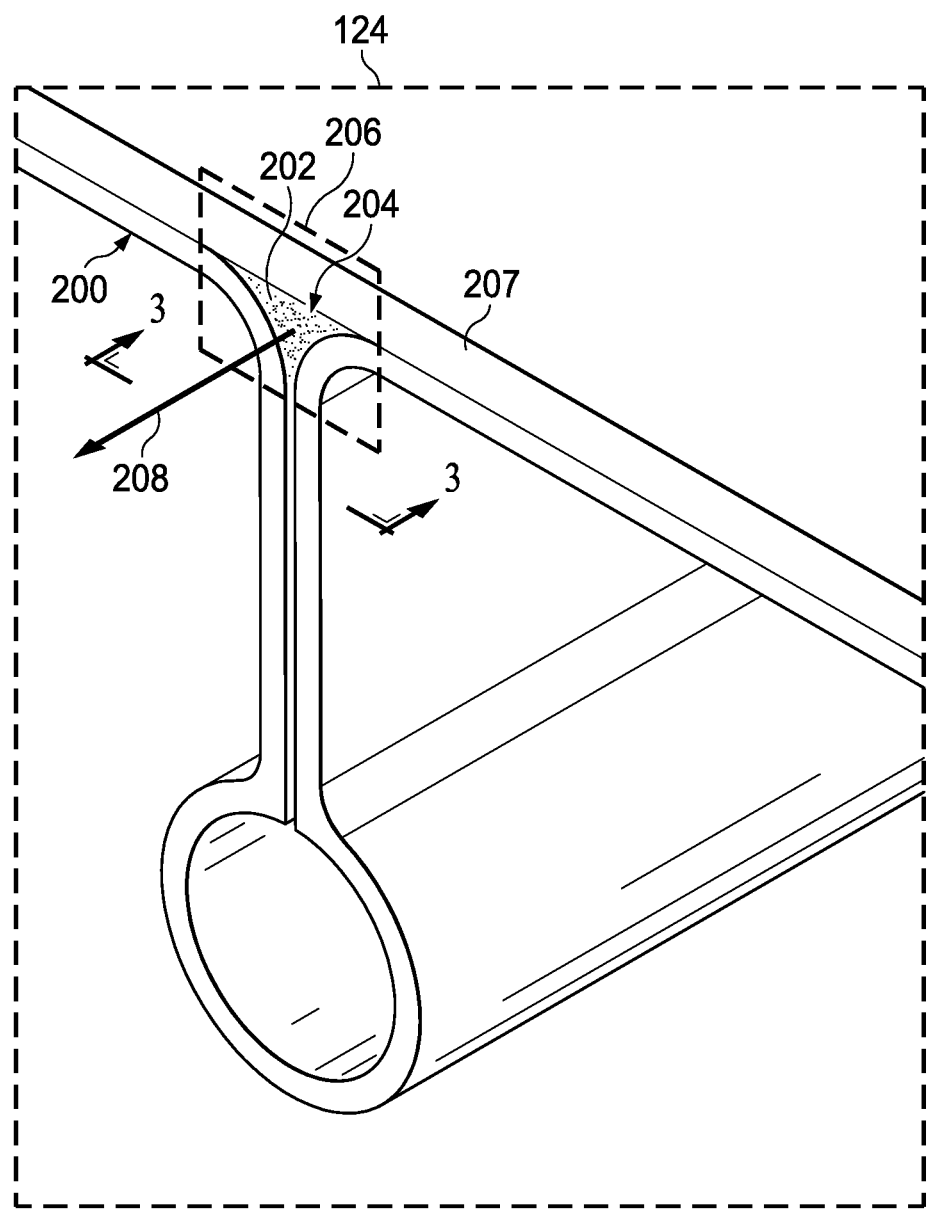
FIG. 2 is an illustration of a more detailed view of a portion of stringers with radius fillers in accordance with an illustrative embodiment.

Turning to FIG. 2, an illustration of a more detailed view of a portion of stringers with radius fillers is depicted in accordance with an illustrative embodiment. In this example, a more detailed illustration of section 124 in FIG. 1 is shown.

In this view of section 124, stringer 200 in stringers 120 in FIG. 1 is seen. Also illustrated in this view is radius filler 202 in radius fillers 122 from FIG. 1.

As depicted, radius filler 202 is positioned within channel 204 formed by a plurality of composite structures, as shown in section 206. Channel 204 is formed by stringer 200 and skin panel 207 in this illustrative example. Channel 204 extends centrally through stringer 200 along axis 208.

Figure 3:
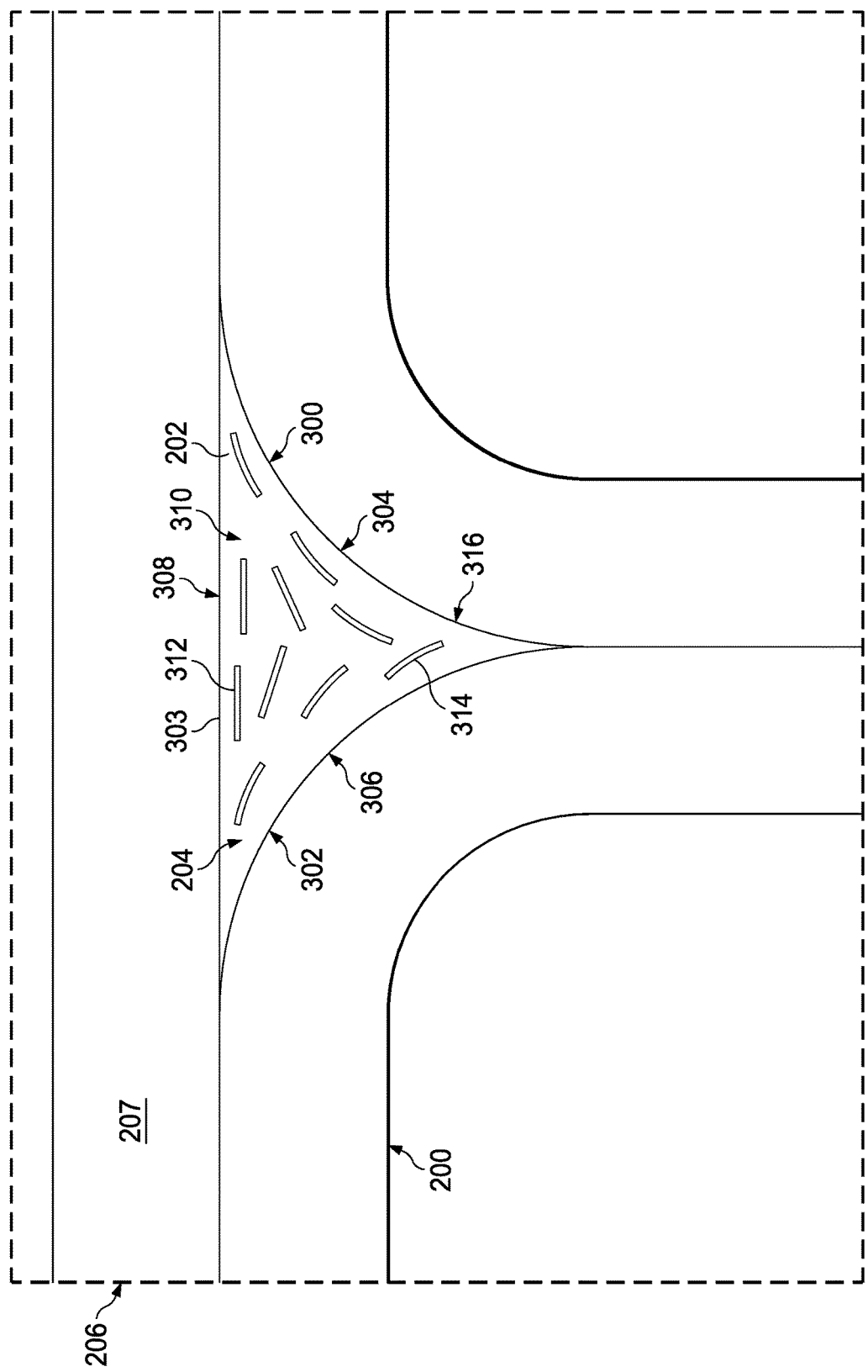
FIG. 3 is an illustration of an enlarged view of a radius filler in accordance with an illustrative embodiment.

Turning now to FIG. 3, an illustration of an enlarged view of a radius filler is depicted in accordance with an illustrative embodiment. FIG. 3 is an enlarged front view of stringer 200, radius filler 202, and skin panel 207 prior to curing shown in the direction of lines 3-3 of FIG. 2.

In this illustrative example, stringer 200 has radius 300 and radius 302. Radius 300 and radius 302 form two walls of channel 204. The third wall of channel 204 is formed by surface 303 of skin panel 207.

Radius filler 202 has first side 304, second side 306, and third side 308 in this illustrative example. First side 304 of radius filler 202 follows radius 300. Second side 306 of radius filler 202 follows radius 302. Third side 308 of radius filler 202 follows surface 303 of skin panel 207. Surface 303 of skin panel 207 may be substantially planar in this illustrative example.

As depicted, radius filler 202 includes composite material 310 and number of heating elements 312 located within composite material 310. As used herein, a "number of" items is one or more items. Thus, number of heating elements 312 is one or more heating elements.

Composite material 310 may take the form of composite prepreg tape in this illustrative example. In other examples, composite material 310 may take the form of a fabric, other suitable types of composite material, or a combination thereof. Radius filler 202 may be formed from a single ply of composite material 310 or multiple plies of composite material 310, depending on the particular implementation.

As illustrated, each heating element in number of heating elements 312 is a structure that includes material with the ability to absorb electromagnetic energy. Number of heating elements 312 absorb the electromagnetic energy and convert that electromagnetic energy into heat. Number of heating elements 312 transfer that heat to the environment surrounding number of heating elements 312. Specifically, number of heating elements 312 transfer that heat to the surrounding composite material 310. In this manner, number of heating elements 312 are inductively heated to cure composite material 310.

In this illustrative example, the heat generated by number of heating elements 312 is used to cure radius filler 202 from the inside out. Current flowing through each of number of heating elements 312 provides localized curing within radius filler 202.

Number of heating elements 312 may be formed from various types of materials. For example, without limitation, number of heating elements 312 may comprise at least one of stainless steel, nickel, a metalized film, a ceramic, aluminum, copper, or other suitable types of materials. Each heating element in number of heating elements 312 may be referred to as a susceptor in this illustrative example.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In an illustrative example, the size, shape, and position of each of number of heating elements 312 may be selected to provide a desired type, manner, or speed of cure. For instance, increasing the number of heating elements placed within radius filler 202 may cure radius filler 202 more quickly.

Further, increasing the size of number of heating elements 312 may generate more heat from each heating element. In still another illustrative example, the spacing between number of heating elements 312 may be selected to cure various portions of radius filler 202 at substantially the same time.

The spacing between number of heating elements 312 also may be selected to distribute a substantially uniform, or constant, amount of heat throughout the radius filler, without curing one portion of composite material 310 more quickly than another. Non-uniform curing outside of selected tolerances may alter the performance of radius filler 202 in an undesired manner.

In addition, the material selected for number of heating elements 312 may be selected to have a desired electromagnetic permeability. The electromagnetic permeability of a material represents the ability of the material to respond to an applied electromagnetic field. In other words, electromagnetic permeability is the ability of the material to support the formation of an induced current, and resulting Joule heating, from a surrounding magnetic field applied to the material.

The higher the electromagnetic permeability of a material, the more easily current is induced within the material. Increasing the permeability of a selected material for number of heating elements 312 increases the efficiency of the system, as heating will occur more quickly and with less power than when using a less electromagnetically permeable material.

In an illustrative example, materials selected for number of heating elements 312 are chosen to provide a desired temperature profile within radius filler 202. Permeability of the material directly affects this temperature profile, as more permeable material produces more heat. By selecting a desired permeability, and providing a desired amount of current to the material, heating of composite material 310 within radius filler 202 may be precisely controlled to cure radius filler 202 uniformly throughout.

In this depicted example, number of heating elements 312 comprises deformable segments of material 314. Deformable segments of material 314 are pieces of material that have the ability to change shape under pressure or stress. For instance, deformable segments of material 314 take the form of thin sheets of material, continuous rods, irregular-shaped segments, other suitable shapes, or some combination thereof.

Deformable segments of material 314 may be desirable because the segments move and bend with composite material 310. For example, deformable segments of material 314 may change dimensions, flatten, bend, or otherwise deform when composite material 310 is pressed into cross-sectional shape 316.

In other examples, number of heating elements 312 may not be deformable. Instead, those segments may be comprised of more rigid materials. In yet another example, number of heating elements 312 may comprise a single piece of material. This material may be a susceptor core running centrally through radius filler 202. When a susceptor core is used, the core material may be deformable or rigid.

As depicted, radius 300, radius 302, and surface 303 define a substantially triangular shape for channel 204. Radius filler 202 has cross-sectional shape 316 that substantially corresponds to the shape of channel 204. In this illustrative example, radius filler 202 has cross-sectional shape 316 that is substantially triangular.

In other illustrative examples, radius filler 202 may have other cross-sectional shapes. The cross-sectional shape of radius filler 202 depends on the shape of channel 204. For example, the shape may be circular, oval, square, irregular, or some other suitable shape. In some cases, a layer of material (not shown in this view) may be present between radius filler 202 and at least one of stringer 200 or skin panel 207.

In the illustrative examples, radius filler 202 may be used even when all of the walls of channel 204 are substantially planar rather than curved. Further, radius filler 202 also may be used when the walls have an irregular surface or shape.

As illustrated, radius filler 202 is cured prior to curing stringer 200 and skin panel 207. Radius filler 202 is cured by inductively heating number of heating elements 312 within radius filler 202. In an illustrative example, "inductively heating," or heating by induction, refers to the process of heating an electrically conductive object by electromagnetism. An induction heat source is used to generate a current within number of heating elements 312 which, in turn, generates heat to cure radius filler 202, as described above. In this manner, radius filler 202 is inductively cured.

In an illustrative example, radius filler 202 is cured while positioned in channel 204 between stringer 200 and skin panel 207. Curing radius filler 202 from the inside out, prior to curing stringer 200 and skin panel 207, is desirable to reduce thermal induced stresses within radius filler 202.

By curing radius filler 202 from within, or "locally" curing radius filler 202, radius filler 202 can experience different phases of the cure cycle without stresses induced by the curing of stringer 200 or skin panel 207. For example, thermal expansion and contraction of the composite material in stringer 200 and skin panel 207 during curing may pull or compress radius filler 202 undesirably, causing stresses within radius filler 202. These stresses may lead to cracking within the radius filler in some instances. In this manner, curing radius filler 202 prior to curing the surrounding lamina structures reduces at least one of thermal induced stress or cracking within radius filler 202.

Figure 4:
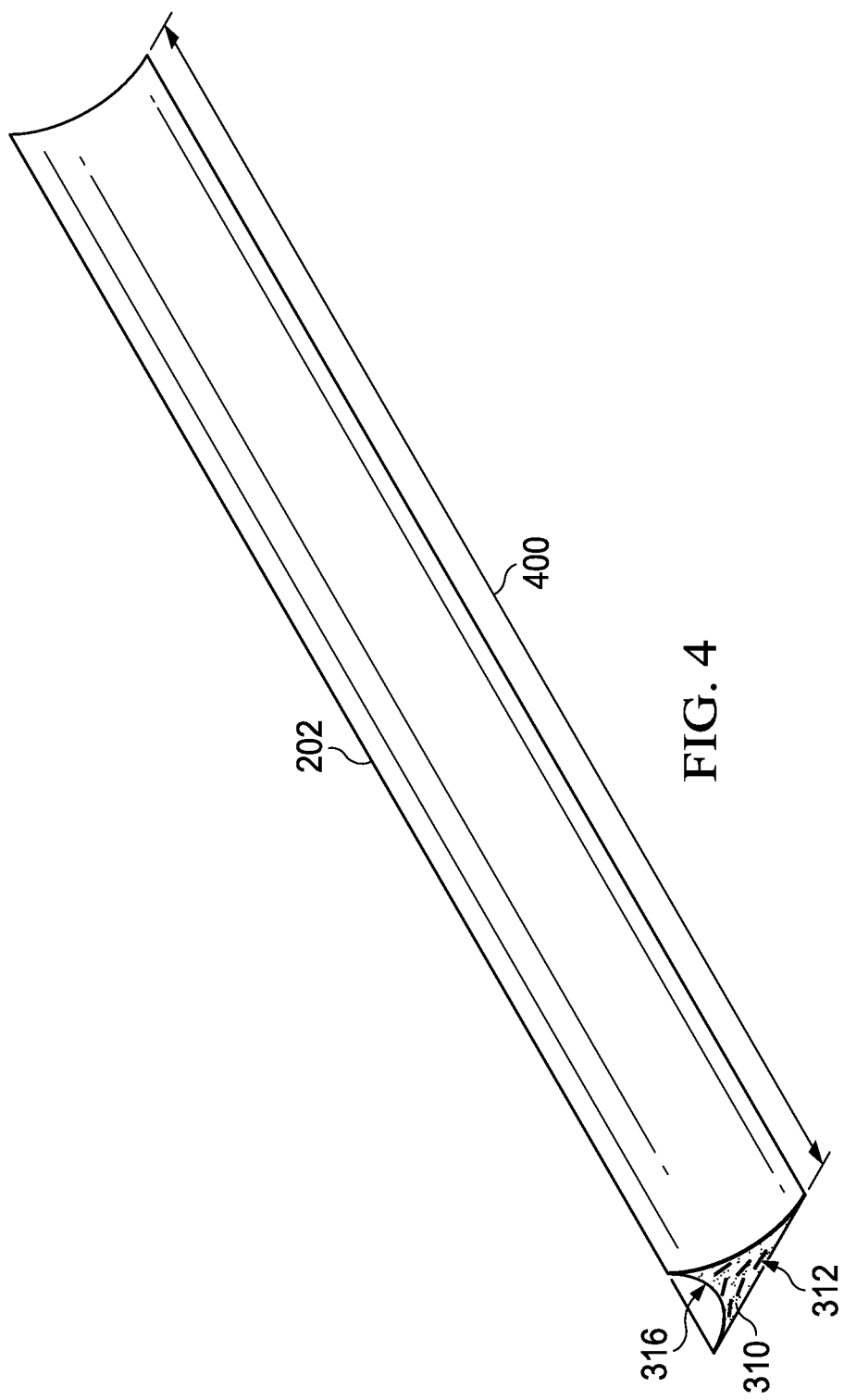
FIG. 4 is an illustration of a perspective view of a radius filler in accordance with an illustrative embodiment.

With reference now to FIG. 4, an illustration of a perspective view of a radius filler is depicted in accordance with an illustrative embodiment. In this figure, radius filler 202 is shown without stringer 200 and skin panel 207 to better illustrate the shape of radius filler 202.

As can be seen in this figure, radius filler 202 has an elongated shape. In the illustrative examples, the three-dimensional shape may take other forms. For example, the three-dimensional shape of radius filler 202 may be curved, saw-toothed, or may have some other suitable shape other than the elongated shape shown in this illustrative example.

In this depicted example, radius filler 202 has length 400. Each of number of heating elements 312 has a uniform thickness and runs along the entirety of length 400 in radius filler 202 in this illustrative example. In other cases, some heating elements may be thicker than others, shorter than others, or some combination thereof.

The part in which radius filler 202 is used is a composite part in this illustrative example. In this manner, radius filler 202 is placed in channel 204, shown in FIGS. 2-3, between a plurality of composite structures. As shown in FIG. 3, stringer 200 and skin panel 207 are both made of composite material.

In FIGS. 5-9, illustrations of a process for manufacturing a radius filler are depicted in accordance with an illustrative embodiment. This process may be manual or automated. The manufacturing process illustrated in FIGS. 5-9 is used to form radius filler 202 and inductively cure radius filler 202 while positioned between stringer 200 and skin panel 207.

Figure 5:
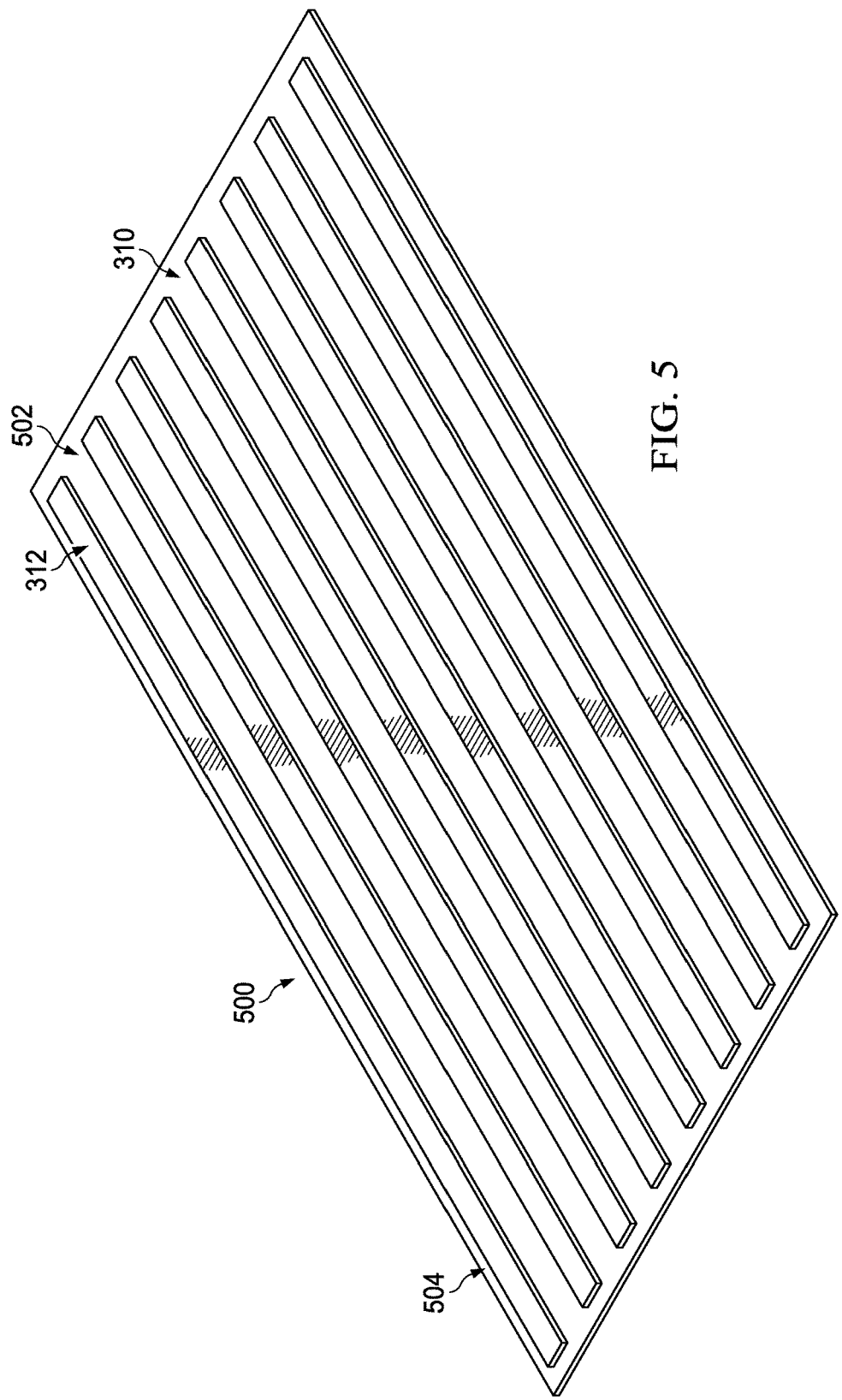
FIG. 5 is an illustration of a composite ply in accordance with an illustrative embodiment.

Referring to FIG. 5, an illustration of a composite ply is depicted in accordance with an illustrative embodiment. Composite ply 500 is comprised of composite material 310. Composite ply 500 is used to form composite filler 202 as shown in FIG. 4.

In this illustrative example, composite ply 500 is a single piece of uncured composite material prior to being folded, stacked, rolled, or otherwise shaped. Composite ply 500 has been cut to a desired shape in this illustrative example.

As depicted, composite ply 500 includes fibers 502 and resin 504. Fibers 502 may be unidirectional in this illustrative example, although bidirectional or multi-directional fibers also may be used. Fibers 502 may be arranged at varying orientations relative to the centerline of composite ply 500. Resin 504 may be an epoxy resin in an illustrative example.

As shown, number of heating elements 312 are positioned relative to composite ply 500. In particular, number of heating elements 312 are placed on top of composite ply 500. In this illustrative example, number of heating elements 312 are laid onto composite ply 500 and held in place by the tack of resin 504. The spacing of each heating element within radius filler 202 is predetermined such that when formed into cross-sectional shape 316, each of number of heating elements 312 maintains a desired distance from one another.

Figure 6:
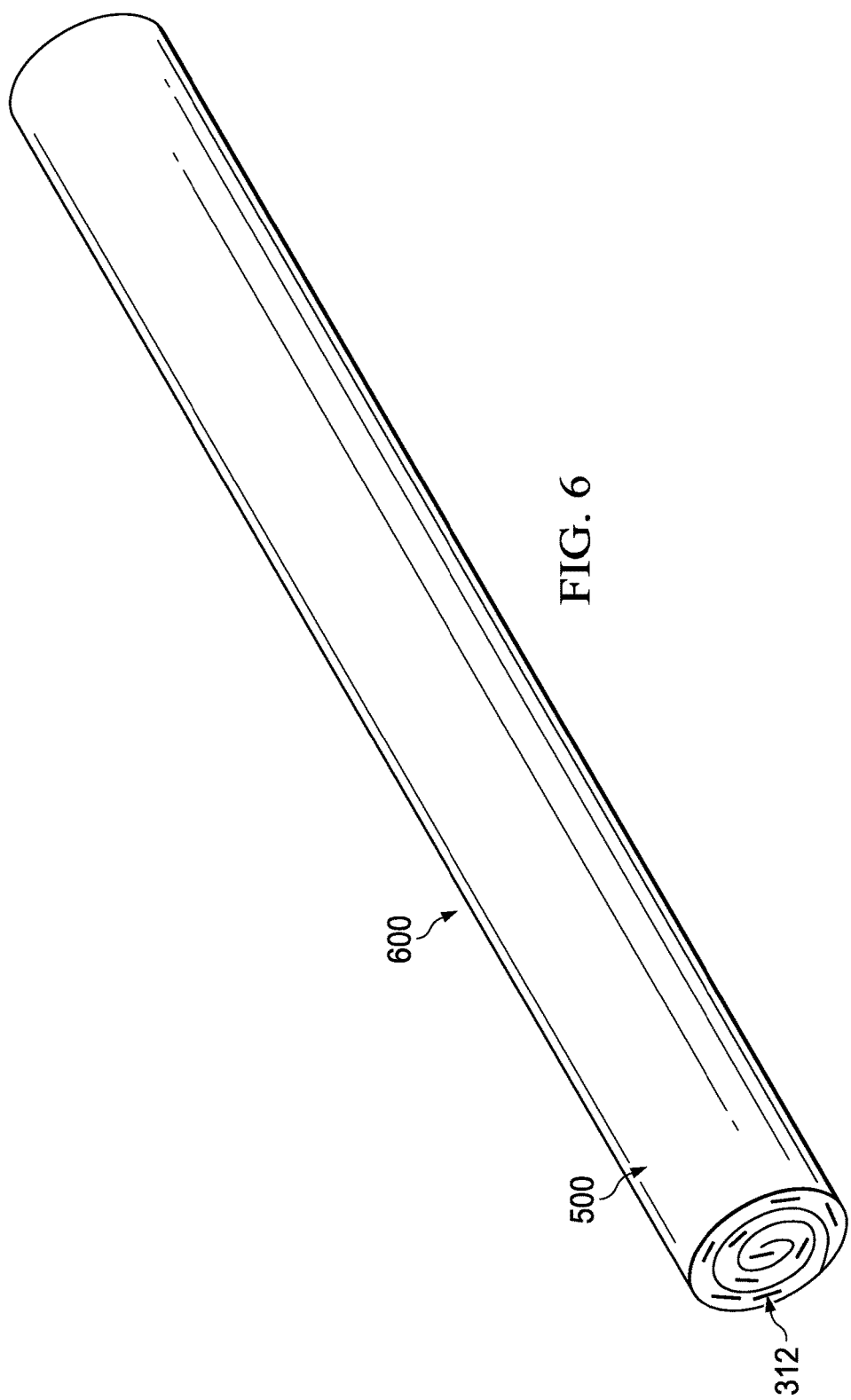
FIG. 6 is an illustration of a rolled composite ply with a number of heating elements in accordance with an illustrative embodiment.

In FIG. 6, an illustration of a rolled composite ply with a number of heating elements is depicted in accordance with an illustrative embodiment. In this depicted example, composite ply 500 with number of heating elements 312 has been rolled to form rolled composite ply 600. Rolled composite ply 600 is ready to be formed into radius filler 202 having cross-sectional shape 316 as seen in FIG. 3.

Figure 7:
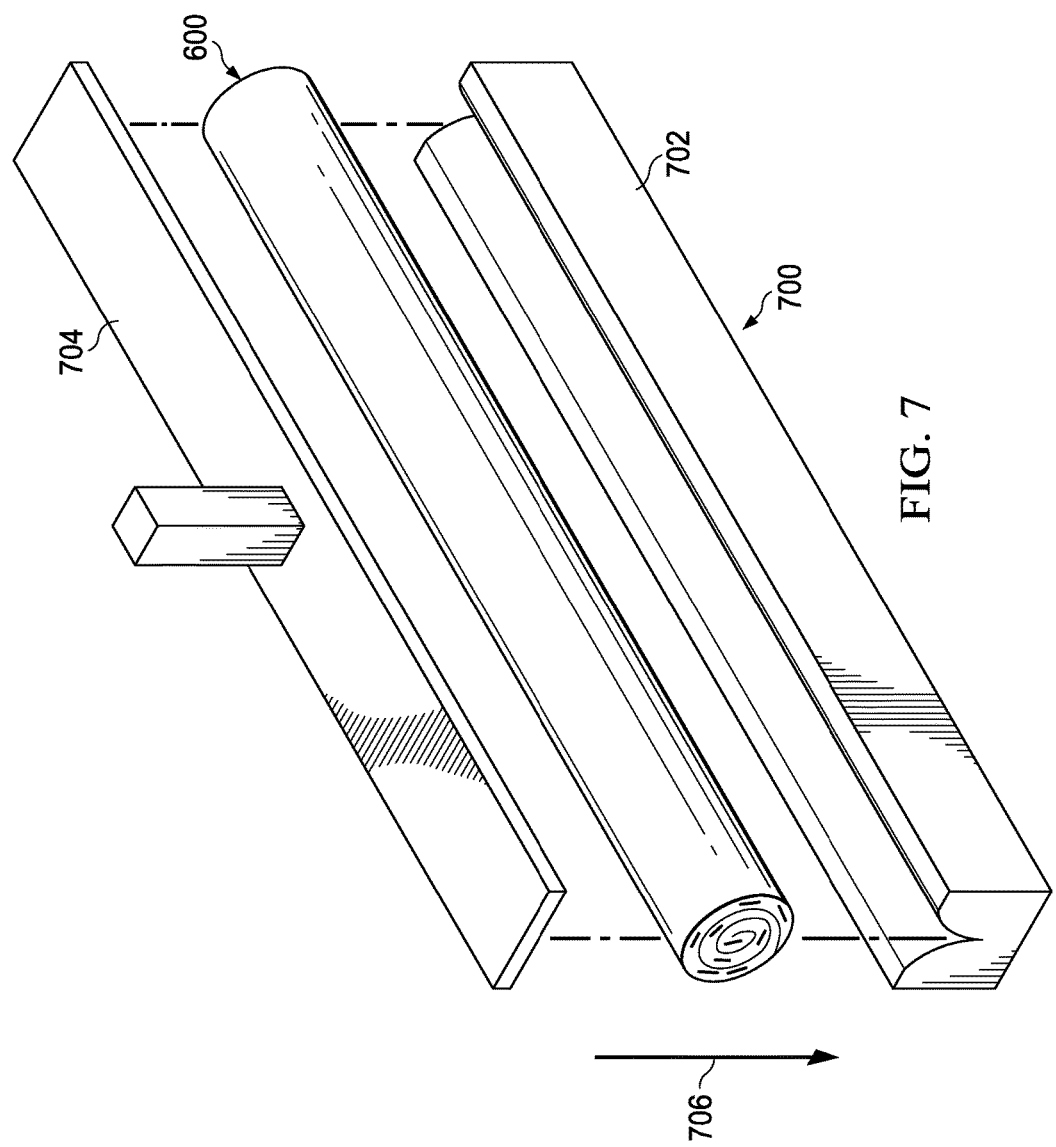
FIG. 7 is an illustration of a shape forming system for forming a radius filler in accordance with an illustrative embodiment.

Turning next to FIG. 7, an illustration of a shape forming system for forming a radius filler is depicted in accordance with an illustrative embodiment. In this illustrative example, shape forming system 700 is shown.

As illustrated, shape forming system 700 includes mold 702 and plate 704. Mold 702 and plate 704 form the shape of channel 204 shown in FIGS. 2-3.

Rolled composite ply 600 is positioned in mold 702. A force is applied in the direction of arrow 706 to compress rolled composite ply 600 with number of heating elements 312 in a desired manner to form radius filler 202, as shown in FIG. 4. Once compressed, radius filler 202 may be trimmed to fit into channel 204.

Shape forming system 700, as shown in this view, is only one example of an implementation for a system configured to form radius filler 202. A die punch or some other system also may be used. A manual system, an automated system, or some combination thereof may be employed.

In some examples, radius filler 202 is formed using a pultrusion system. The term "pultrusion" refers to the process for manufacturing composite materials with a constant cross-section, where the composite materials are pulled through a set of forming dies. In this illustrative example, a "set of" items means one or more items. In this manner, a set of dies is one or more dies.

With a pultrusion system, a flat charge of composite material 310 is pulled through a series of folding dies to form a near-net shape. Thereafter, the pultrusion system pulls the folded material through another series of dies to compact it into its final form. Wires are used to pull composite material 310 through the pultrusion system. These wires may be number of heating elements 312. In this manner, number of heating elements 312 have a dual purpose—to aid in moving composite material 310 through the pultrusion process and to inductively cure radius filler 202 once formed. At the end of a pultrusion cycle, radius filler 202 may have desired cross-sectional shape 316 as shown in FIG. 4.

Figure 8:
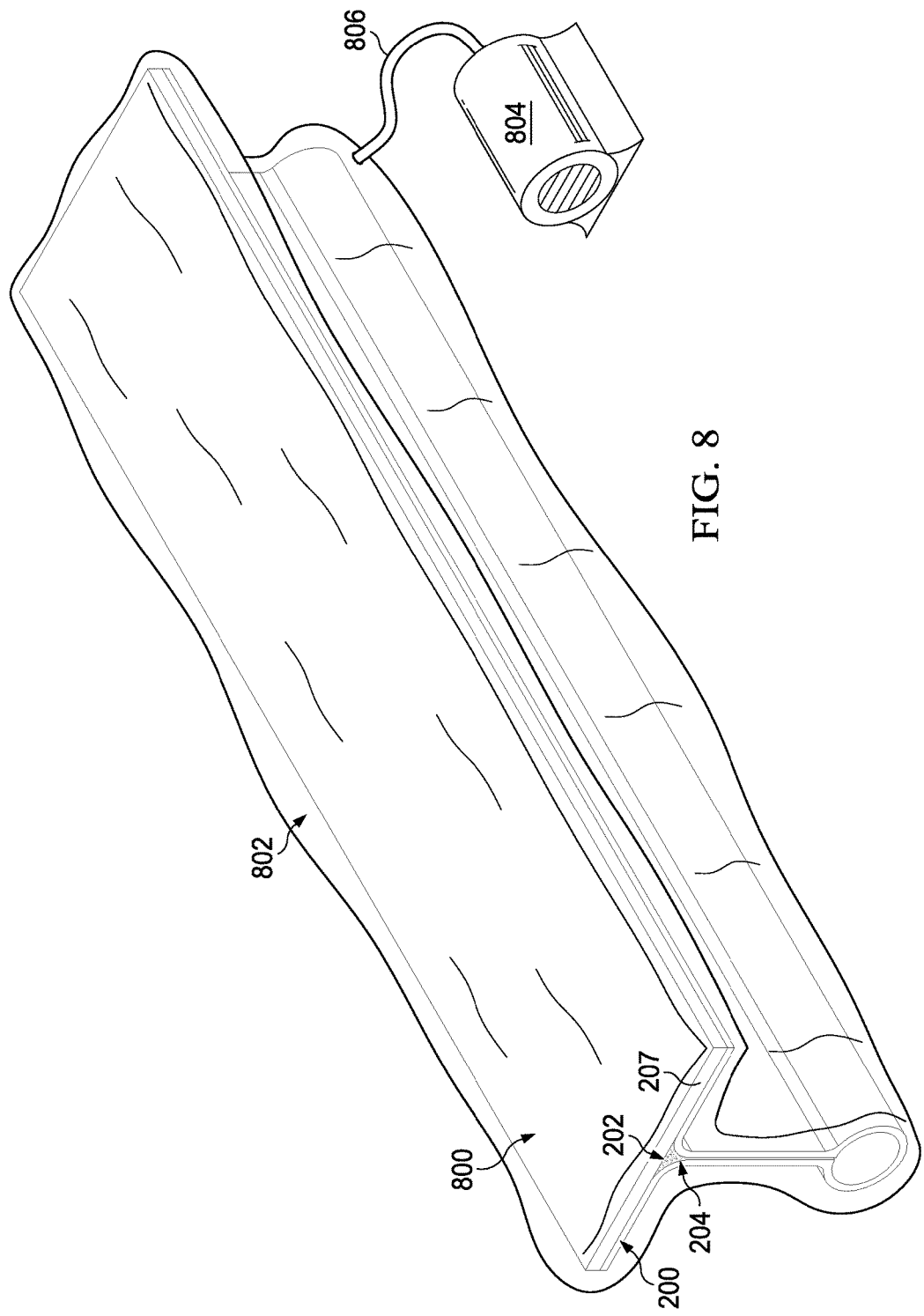
FIG. 8 is an illustration of a radius filler positioned between a plurality of composite structures in accordance with an illustrative embodiment.

Turning next to FIG. 8, an illustration of a radius filler positioned between a plurality of composite structures is depicted in accordance with an illustrative embodiment. As shown, radius filler 202 is positioned in channel 204 formed by stringer 200 and skin panel 207.

At this point, stringer 200 and skin panel 207 remain uncured. Stringer 200, skin panel 207, and radius filler 202 form composite assembly 800 in this illustrative example. Vacuum bag 802 is placed over composite assembly 800. Vacuum bag 802 is connected to vacuum source 804 via vacuum line 806. Vacuum source 804 may be configured to pull a vacuum on composite assembly 800 to provide a desired amount of pressure during curing.

Composite assembly 800 then may be placed in an induction heater (not shown). The induction heater comprises various components configured to inductively heat number of heating elements 312 within radius filler 202 shown in FIG. 3. For example, without limitation, the induction heater may include induction coils that generate a magnetic field to induce the current in number of heating elements 312. As an example, the induction heater may include solenoid coils.

When composite assembly 800 is placed in the induction heater, a vacuum is pulled on vacuum bag 802. Alternating current is supplied to the induction heater to generate the magnetic field.

In some cases, a feedback system (not shown) may be employed with an illustrative embodiment. This feedback system may include, for example, without limitation, a sensor system that sends thermal feedback to determine the temperature profile within radius filler 202. The sensor system may comprise a number of temperature sensors.

In an illustrative example, thermal feedback may be used to identify the different temperatures within various areas, or zones, within radius filler 202. The thermal feedback may indicate whether radius filler 202 is being cured at a uniform rate. Thermal feedback may be collected by measuring the heat generated by inductively heating a segment of material that is substantially identical to number of heating elements 312 under substantially identical conditions. In other words, thermal feedback about radius filler 202 is obtained by using a control specimen.

Once thermal feedback is received, the current sent through number of heating elements 312 may be altered. For instance, the induction heater may be cycled between an on state and an off state to produce the desired temperature profile within radius filler 202. This process may be implemented by a human operator, a computer-controlled device, or some combination thereof.

In other illustrative examples, thermal feedback may not be used. Instead, the cycle times of the induction heater may be predetermined.

While the induction heater is in the on state, heat is produced in number of heating elements 312 at a rate slightly higher than they are able to shed via thermal conduction to the surrounding composite material 310. Turning the induction heater off briefly allows for the heat transfer to occur before the next cycle starts. As composite material 310 gains heat, the heat transfer from number of heating elements 312 to the surrounding composite material 310 slows down. To compensate, the cycle times of the induction heater are timed at varying intervals to introduce heat at a steady rate overall.

In an illustrative example, the power source (not shown) used to supply current to the induction heater has parameters that are adjusted for each radius filler design to provide a desired amount of heat to cure radius filler 202 without overheating the part and risking mechanical property degradation. The power load, measured in wattage, and frequency of the alternating current, as well as the diameter and material of the induction coils, is paired with the material selected for number of heating elements 312.

In this example, the frequency is typically about 5 kHz to about 200 kHz. The power load, frequency, and diameter of induction coils are also paired with the size, shape, number, and surface area of number of heating elements 312. For example, without limitation, using a ten turn copper coil, about ten centimeters in diameter with a power level of about 800 watts and a frequency of about 50 kHz may be sufficient to provide number of heating elements 312, in the form of a single stainless steel susceptor wire, with enough heat to cure a few linear feet of radius filler 202.

As another example, if number of heating elements 312 were copper instead, an increase in frequency and a decrease in power may be warranted, depending on the particular implementation. These numbers would vary depending on the on and off schedule for the induction power source, among other factors.

In this depicted example, radius filler 202 is cured prior to curing stringer 200 and skin panel 207. By inductively heating number of heating elements 312, curing is localized to radius filler 202. In this manner, stringer 200 and skin panel 207 remain uncured.

After radius filler 202 is cured, radius filler 202 is allowed to cool. For example, without limitation, radius filler 202 may be allowed to cool to room temperature before a traditional cure cycle is completed on stringer 200 and skin panel 207.

Figure 9:
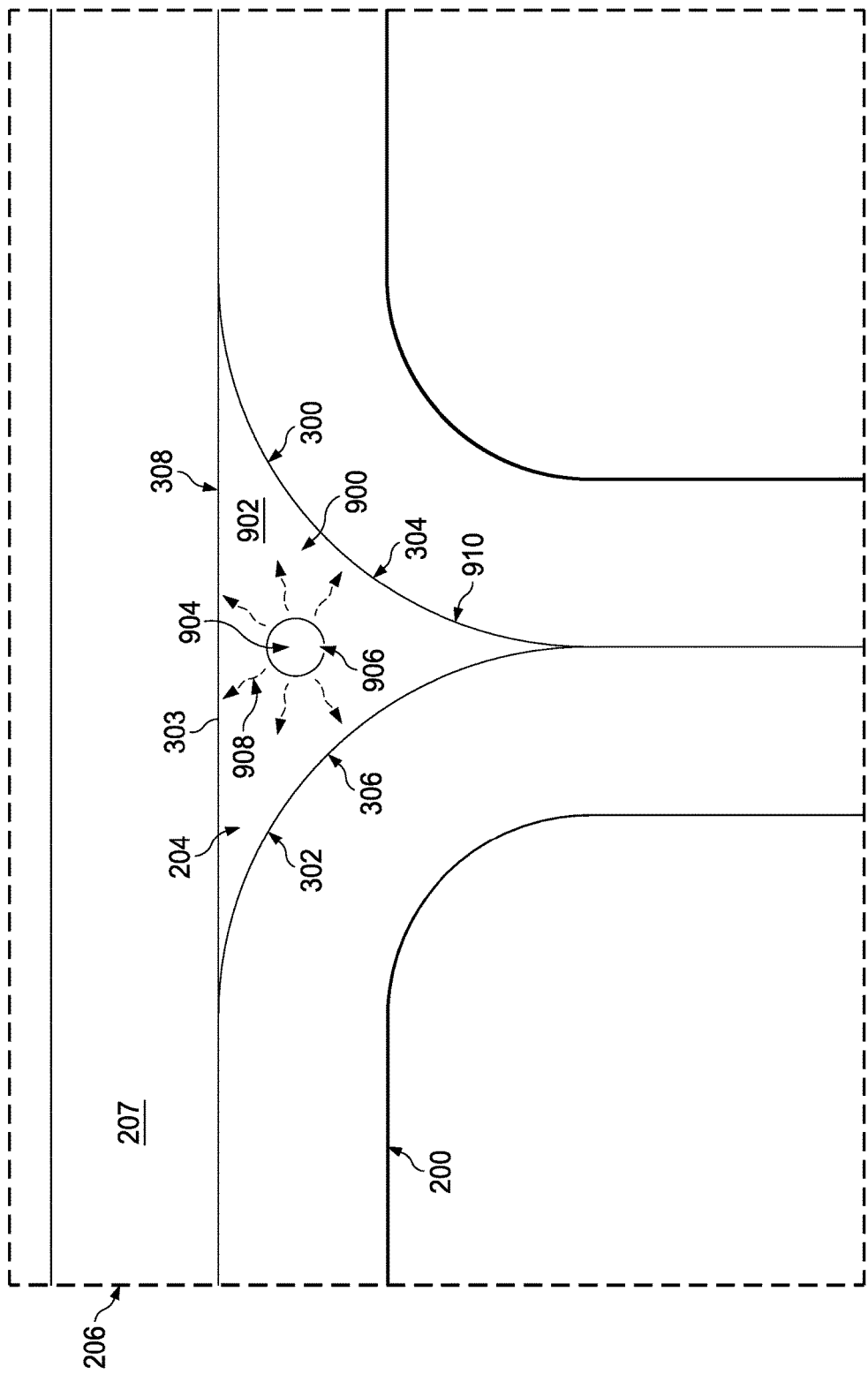
FIG. 9 is an illustration of an enlarged view of a radius filler in accordance with an illustrative embodiment.

In FIG. 9, an illustration of an enlarged view of a radius filler is depicted in accordance with an illustrative embodiment. FIG. 9 is an enlarged front view of stringer 200 and skin panel 207 prior to curing in the direction of lines 3-3 of FIG. 2. Radius filler 900 has replaced radius filler 202 in channel 204 in this illustrative example.

As depicted, radius filler 900 includes composite material 902 and heating element 904 located within composite material 902. In this illustrative example, heating element 904 takes the form of susceptor core 906. Susceptor core 906 is a single elongate rod that extends through the center of radius filler 900. When inductively heated, susceptor core 906 generates heat 908 to cure radius filler 900 from the inside out.

In an illustrative example, susceptor core 906 may be positioned within composite material 902 during a pultrusion process. A pultrusion system may grip susceptor core 906 as it pulls composite material 902 through the dies. Alternatively, composite material 902 may take the form of a number of composite plies wrapped around susceptor core 906 and then die-formed to have cross-sectional shape 910.

Figure 10:
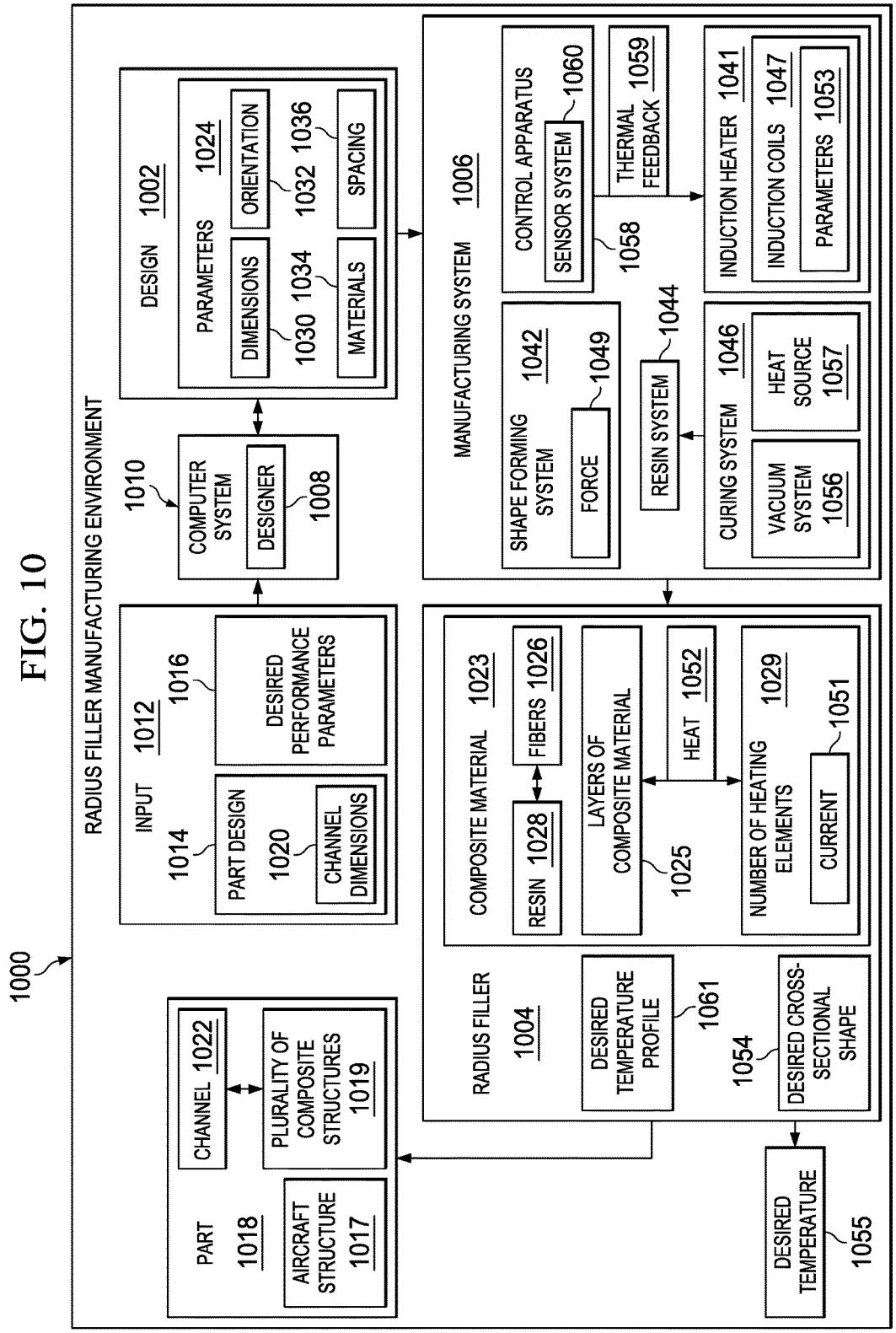
FIG. 10 is an illustration of a block diagram of a radius filler manufacturing environment in accordance with an illustrative embodiment.

Turning next to FIG. 10, an illustration of a block diagram of a radius filler manufacturing environment is depicted in accordance with an illustrative embodiment. In this illustrative example, radius filler manufacturing environment 1000 is depicted in block form to illustrate different components for one or more illustrative embodiments that may be used to manufacture radius fillers and parts with radius fillers.

In this illustrative example, design 1002 may be generated for radius filler 1004. Design 1002 may be, for example, a computer-aided design model or some other model that may be used to control manufacturing system 1006 to fabricate radius filler 1004. In this illustrative example, design 1002 may be generated using designer 1008.

Designer 1008 may be implemented in software, hardware, firmware or a combination thereof. When software is used, the operations performed by designer 1008 may be implemented in program code configured to run on a processor unit. When firmware is used, the operations performed by designer 1008 may be implemented in program code and data and stored in persistent memory to run on a processor unit. When hardware is employed, the hardware may include circuits that operate to perform the operations in designer 1008.

In the illustrative examples, the hardware may take the form of a circuit system, an integrated circuit, an application specific integrated circuit (ASIC), a programmable logic device, or some other suitable type of hardware configured to perform a number of operations.

With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, designer 1008 may be implemented in computer system 1010. Computer system 1010 may be one or more computers. When more than one computer is present in computer system 1010, those computers may communicate with each other using a communications media such as a network.

In the illustrative example, design 1002 for radius filler 1004 is generated using input 1012. Input 1012 may include, for example, part design 1014, desired performance parameters 1016, and other suitable types of input. Input 1012 may originate from various sources. For example, input 1012 may be received from at least one of a file, a human operator, a computer-aided design, a specification, or some other suitable source.

In the illustrative example, part design 1014 may be a computer-aided design model of part 1018 in which radius filler 1004 is to be used. Part 1018 may be selected from one of, for example, a composite part, a stringer, wing stringer, a T-shaped stringer, a horizontal stabilizer, a winglet, a wing box, an I-beam, a stiffener, a wing, or some other suitable part. Part 1018 may take the form of aircraft structure 1017. Part 1018 may include plurality of composite structures 1019 in some cases.

In the illustrative example, part design 1014 may include channel dimensions 1020 for part 1018 in which radius filler 1004 is to be located. Channel dimensions 1020 may include, for example, at least one of cross-sectional shapes, diameter, length, or other suitable parameters that may be used to describe channel 1022 in part 1018 in which radius filler 1004 is to be located.

Desired performance parameters 1016 are for the performance of radius filler 1004 in part 1018. In this illustrative example, desired performance parameters 1016 may be selected from at least one of a load, a coefficient of thermal expansion, toughness, fracture resistance, stiffness, strength, or other suitable performance parameters that may be desirable for radius filler 1004. For example, a coefficient of thermal expansion may be selected to minimize through-thickness stresses. Through-thickness stresses may be stresses in the direction out of the plane to the ply.

With input 1012, designer 1008 generates design 1002. For example, designer 1008 may generate parameters 1024 for radius filler 1004. As depicted, parameters 1024 may be selected for composite material 1023. For example, parameters 1024 are selected for a number of layers of composite material 1025. Each of these layers may be a ply.

In an illustrative example, parameters 1024 may be selected for fibers 1026 and resin 1028 in each layer in the number of layers of composite material 1025 in radius filler 1004. Parameters 1024 are also selected for number of heating elements 1029. For example, parameters 1024 may include at least one of dimensions 1030, orientation 1032, materials 1034, spacing 1036, or other suitable parameters.

Parameters 1024 may be selected such that radius filler 1004 is cured by number of heating elements 1029 in a desired manner. For example, parameters 1024 may include dimensions 1030 of each of number of heating elements 1029 used to inductively cure radius filler 1004. As an example, larger elements may be selected when radius filler 1004 is bigger.

As another example, parameters 1024 may include orientation 1032 for fibers 1026, number of heating elements 1029, or both. Orientation 1032 may describe how each of number of heating elements 1029 are arranged relative to a centerline, central axis, or radius filler 1004. Orientation 1032 also describes the orientation of fibers 1026 within each composite layer.

In the illustrative example, dimensions 1030 and orientation 1032 for each layer of composite material 1025 may provide reinforcement in all three axes once the composite ply is folded. This type of reinforcement may result in a reduction in the formation of inconsistencies in at least one of radius filler 1004 or part 1018.

In the illustrative examples, materials 1034 may be used to describe materials used or at least one of fibers 1026, resin 1028, or number of heating elements 1029. For example, materials 1034 for fibers 1026 may be selected from at least one of a metal, a metal alloy, carbon fiber, or some other suitable material. Materials 1034 for resin 1028 may be selected from one of a thermoplastic polymer, a thermoset polymer, an epoxy, a bis-maleimide resin, a polyamide, polyurethane, plastic, a metal, a polyester resin, a shape memory polymer (SMP) resin, and other suitable materials.

The toughness of materials 1034 for fibers 1026 also may result in a reduction in the formation of inconsistencies. The reduction in the propagation of an inconsistency also may be realized through the selection of number of heating elements 1029 and the manner in which radius filler 1004 is cured.

In a depicted example, materials 1034 for number of heating elements 1029 are selected to have a permeability that is conducive to substantially uniform curing of radius filler 1004. Materials 1034 for number of heating elements 1029 may be selected from at least one of a metal, a metalized film, a ceramic or a ceramic material, among others.

Parameters 1024 also may include spacing 1036 between each of number of heating elements 1029. Spacing 1036 may represent a desired distance between number of heating elements 1029 within selected tolerances. Spacing 1036 may be a desired spacing to lay up number of heating elements 1029 or may be a desired spacing between number of heating elements 1029 once radius filler 1004 is formed.

In the illustrative example, manufacturing system 1006 may use design 1002 to manufacture radius filler 1004. Additionally, manufacturing system 1006 also may manufacture part 1018 including radius filler 1004.

Manufacturing system 1006 includes a number of different types of components. For example, manufacturing system 1006 may include induction heater 1041, shape forming system 1042, resin system 1044, and curing system 1046. In this illustrative example, induction heater 1041, shape forming system 1042, resin system 1044, and curing system 1046 may include various devices. These devices may be computer-controlled or operated by a human operator.

As depicted, induction heater 1041 includes various components configured to inductively heat number of heating elements 1029. For example, induction heater 1041 may include induction coils 1047. Induction coils 1047 induce current 1051 in number of heating elements 1029 through electromagnetism. Current 1051 produces heat 1052 within number of heating elements 1029 to cure radius filler 1004 from the inside out. Heat 1052 does not cure plurality of composite structures 1019.

In an illustrative example, induction coils 1047 have parameters 1053. Parameters 1053 may include a type of material, a size, a shape, or other parameters. Parameters 1053 for induction coils 1047 may be paired with parameters 1024 for number of heating elements 1029 to provide a cured radius filler 1004 in a desired manner.

As illustrated, shape forming system 1042 may be a system used to compress layers of composite material 1025 and number of heating elements 1029 to form radius filler 1004 with desired cross-sectional shape 1054. Desired cross-sectional shape 1054 may conform to channel 1022 in part 1018.

In this illustrative example, shape forming system 1042 may be a press, a die punch, a pultrusion system, or other device. Shape forming system 1042 applies force 1049 to compress layers of composite material 1025 and number of heating elements 1029.

Resin system 1044 is configured to place resin 1028 into fibers 1026 of radius filler 1004. In these illustrative examples, resin system 1044 may be selected from at least one of a resin injection system, a resin infusion system, or some other suitable type of system that places resin 1028 into fibers 1026.

In some cases, when layers of composite material 1025 take the form of composite prepreg tape, resin system 1044 is used to preimpregnate layers of composite material 1025. In other examples, when a pultrusion system is used for shape forming system 1042, resin system 1044 may be integrated within shape forming system 1042.

As illustrated, curing system 1046 comprises components configured to cure part 1018. Specifically, curing system 1046 cures the structures surrounding radius filler 1004 after radius filler 1004 has been cured and subsequently cooled to desired temperature 1055. Desired temperature 1055 may be room temperature in this illustrative example.

In a depicted example, curing system 1046 may include vacuum system 1056 and heat source 1057. Vacuum system 1056 may comprise a number of components configured to apply a desired amount of pressure to part 1018 and radius filler 1004 during curing. For example, without limitation, vacuum system 1056 may include a vacuum source, a set of vacuum lines, a vacuum bag, and other components. Vacuum system 1056 is used in conjunction with induction heater 1041 to cure radius filler 1004. Vacuum system 1056 is also used with heat source 1057 to cure the remaining composite structures that form part 1018.

In this illustrative example, heat source 1057 includes various components configured to provide a desired amount of heat to cure part 1018. Heat source 1057 may take the form of, for example, without limitation, a heat blanket, an autoclave, or some other type of heat source.

In some cases, manufacturing system 1006 may include additional tools to cut number of layers of composite material 1025, trim radius filler 1004, bond components, or perform other processes. For example, manufacturing system 1006 may include devices for cooling radius filler 1004 after curing, if passive cooling is not preferred. Manufacturing system 1006 also may include components configured to position radius filler 1004 in channel 1022.

In yet another example, manufacturing system 1006 may include control apparatus 1058 that provides thermal feedback 1059. Control apparatus 1058 may include a piece of control material that is substantially identical to the material selected for number of heating elements 1029. Control apparatus 1058 also may include sensor system 1060. Sensor system 1060 may measure the temperature of various portions of the piece of material to generate thermal feedback 1059. In this manner, control apparatus 1058 provides thermal feedback 1059 such that induction heater 1041 may be adjusted to provide desired temperature profile 1061 within radius filler 1004.

The illustration of radius filler manufacturing environment 1000 in FIG. 10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although radius filler 1004 has been described for part 1018 for use in aircraft, radius filler 1004 may be designed and used in parts other than those for aircraft. For example, part 1018 may be used in a platform such as, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIGS. 1-9 may be combined with components in FIG. 10, used with components in FIG. 10, or a combination of the two. Additionally, some of the components in FIGS. 1-9 may be illustrative examples of how components shown in block form in FIG. 10 can be implemented as physical structures.

Figure 11:
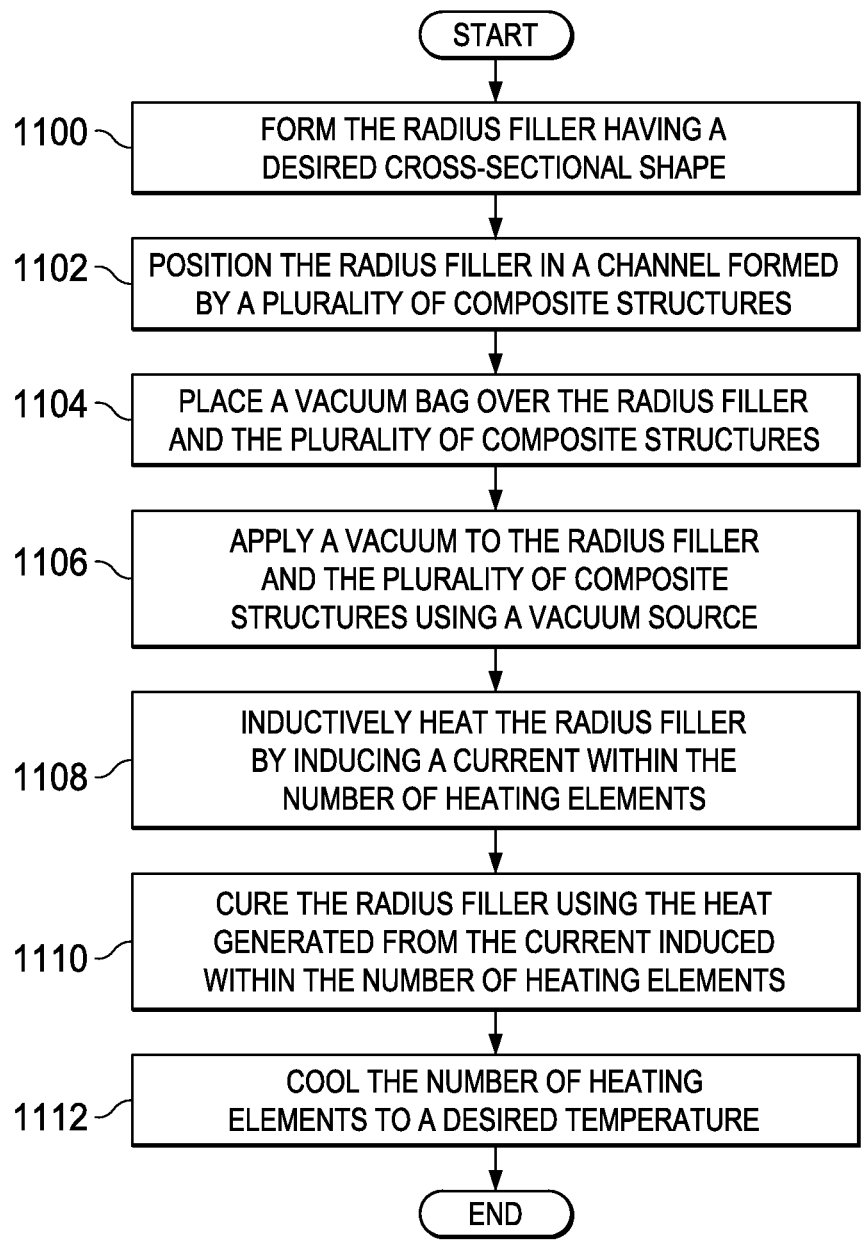
FIG. 11 is an illustration of a flowchart of a process for manufacturing a radius filler in accordance with an illustrative embodiment.

With reference now to FIG. 11, an illustration of a flowchart of a process for manufacturing a radius filler is depicted in accordance with an illustrative embodiment. The process illustrated in FIG. 11 may be implemented in radius filler manufacturing environment 1000 to form and cure radius filler 1004 shown in FIG. 10.

The process begins by forming the radius filler having a desired cross-sectional shape (operation 1100). The radius filler has a composite material and a number of heating elements located within the composite material.

Next, the radius filler is positioned in a channel formed by a plurality of composite structures (operation 1102). The plurality of composite structures may have been previously positioned relative to one another such that the channel is formed between the plurality of composite structures.

Thereafter, the process places a vacuum bag over the radius filler and the plurality of composite structures (operation 1104). The process then applies a vacuum to the radius filler and the plurality of composite structures using a vacuum source (operation 1106).

Next, the process inductively heats the radius filler by inducing a current within the number of heating elements (operation 1108). For instance, an induction heater may be activated to induce a current in the number of heating elements through electromagnetism. The vacuum is applied to the radius filler and the plurality of composite structures as the radius filler is inductively heated.

The process then cures the radius filler using the heat generated from the current induced within the number of heating elements (operation 1110). The radius filler is cured prior to curing the plurality of composite structures. The vacuum remains applied while curing.

The process cools the number of heating elements to a desired temperature (operation 1112), with the process terminating thereafter. This cooling is a passive process in the illustrative examples. In other words, the number of heating elements and the radius filler are allowed to cool to room temperature without the use of a cooling device.

Once cooled, the plurality of composite structures may be cured around the radius filler to form an aircraft structure. The plurality of composite structures may be cured using, for example, without limitation, a curing system, as described above. During curing of the plurality of composite structures, the radius filler is bonded to the surrounding lamina.

Figure 12:
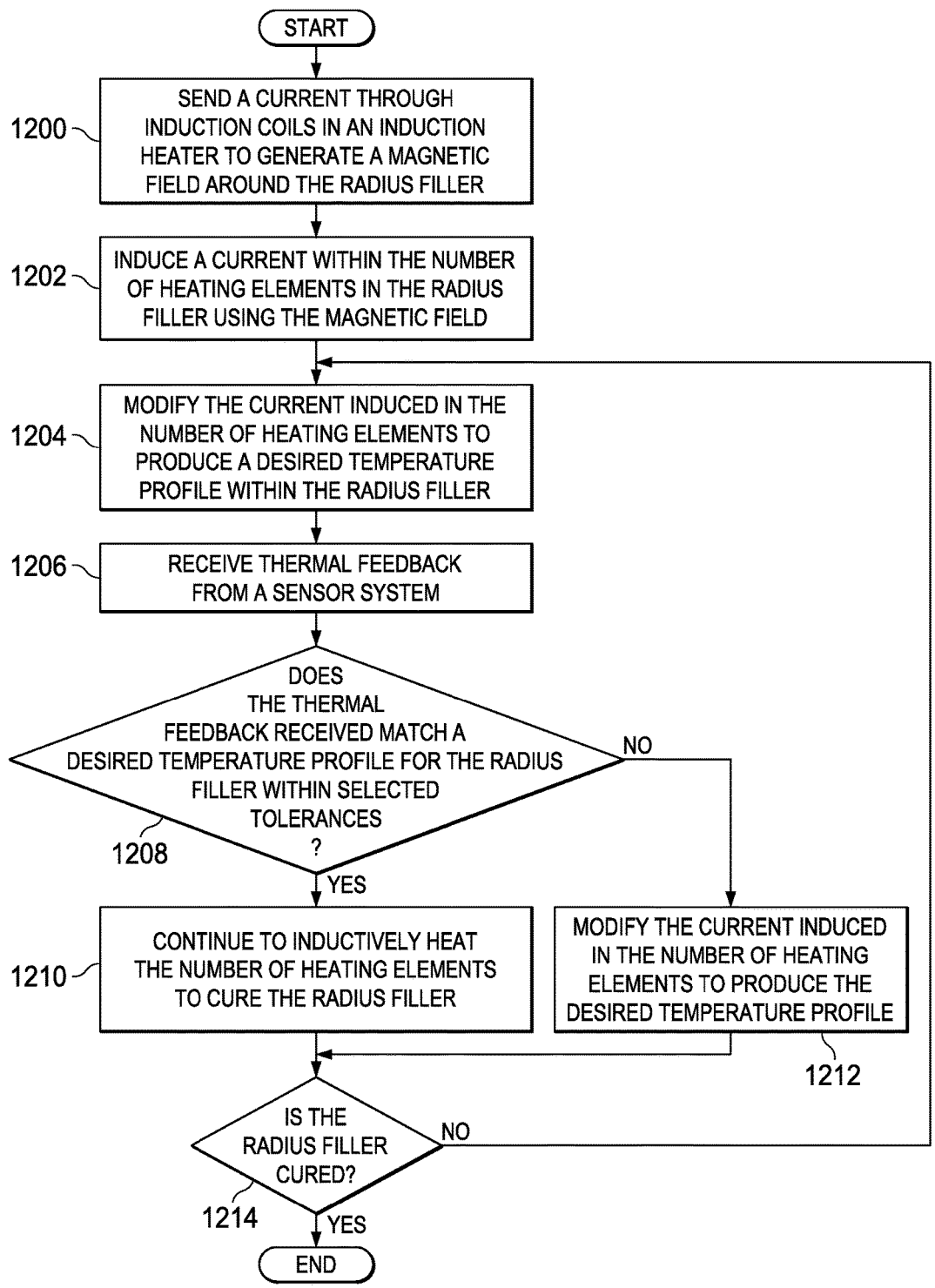
FIG. 12 is an illustration of a flowchart of a process for inductively heating a radius filler in accordance with an illustrative embodiment.

Turning next to FIG. 12, an illustration of a flowchart of a process for inductively heating a radius filler is depicted in accordance with an illustrative embodiment. The process illustrated in FIG. 12 may be implemented by induction heater 1041 during operation 1108 in FIG. 11.

The process begins by sending a current through induction coils in an induction heater to generate a magnetic field around the radius filler (operation 1200). The current sent through the coils is an alternating current. Next, the process induces a current within the number of heating elements in the radius filler using the magnetic field (operation 1202).

Thereafter, the process modifies the current induced in the number of heating elements to produce a desired temperature profile within the radius filler (operation 1204). For instance, the induction heater may be switched between the on state to the off state to generate a desired amount of current in the number of heating elements.

The process may then receive thermal feedback from a sensor system (operation 1206). For example, a control apparatus with a sensor system may provide the thermal feedback.

The process then determines whether the thermal feedback received matches a desired temperature profile for the radius filler within selected tolerances (operation 1208). If the profiles match, the process continues to inductively heat the number of heating elements to cure the radius filler (operation 1210). Otherwise, the process modifies the current induced in the number of heating elements to produce the desired temperature profile (operation 1212).

Next, the process determines whether the radius filler is cured (operation 1214). This determination may be made by a human operator, a sensor system, a computer-controlled device, or a combination thereof. Further, the determination may be made based on a period of time under which the radius filler has been curing.

If the radius filler is cured, the process terminates. If the radius filler is not cured, the process returns to operation 1204 as described above.

In some illustrative examples, operations 1206-1210 may be omitted. Instead, the behavior of the induction heater may be preprogrammed and not based on thermal feedback.

Figure 13:
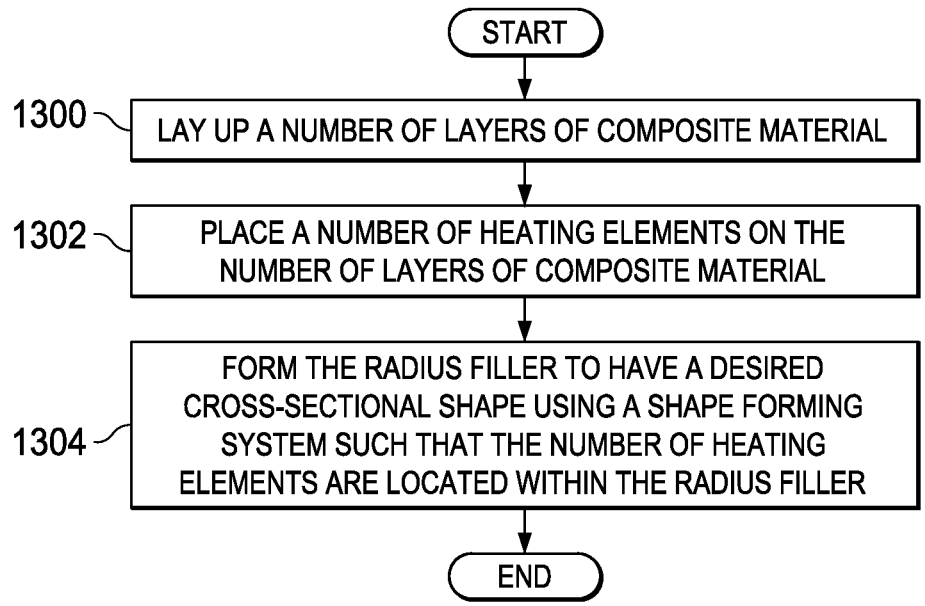
FIG. 13 is an illustration of a flowchart of a process for forming a radius filler in accordance with an illustrative embodiment.

Referring next to FIG. 13, an illustration of a flowchart of a process for forming a radius filler is depicted in accordance with an illustrative embodiment. The process illustrated in FIG. 13 may be implemented using shape forming system 1042 to form radius filler 1004 shown in FIG. 10.

The process begins by laying up a number of layers of composite material (operation 1300). For example, number of layers of composite material 1025 may be laid up on a tool by hand.

The process then places a number of heating elements on the number of layers of composite material (operation 1302). These heating elements may include deformable segments of material.

Next, the process forms the radius filler to have a desired cross-sectional shape using a shape forming system such that the number of heating elements are located within the radius filler (operation 1304), with the process terminating thereafter.

Figure 14:
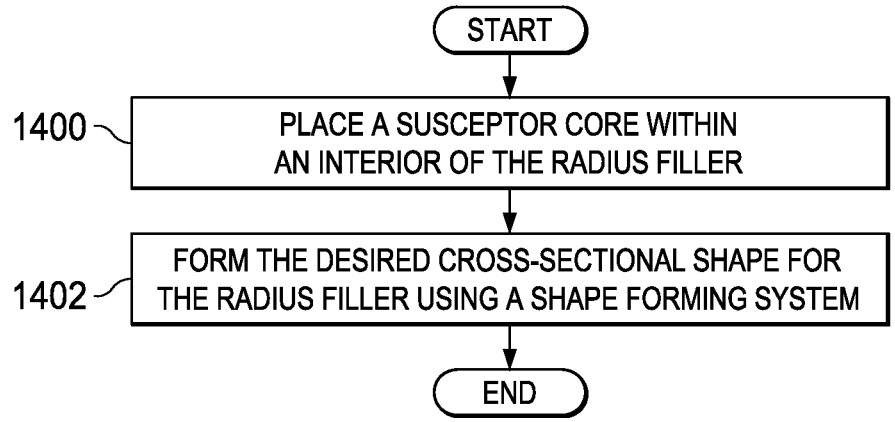
FIG. 14 is an illustration of a flowchart of a process for forming a radius filler in accordance with an illustrative embodiment.

In FIG. 14, an illustration of a flowchart of a process for forming a radius filler is depicted in accordance with an illustrative embodiment. The process illustrated in FIG. 14 is another example of a process that may be implemented to form radius filler 1004 shown in FIG. 10.

The process begins by placing a susceptor core within an interior of the radius filler (operation 1400). The susceptor core may be placed within the interior of the radius filler by orienting the core along a central axis of the radius filler. For instance, the core may be positioned relative to the composite material used to form the radius filler.

The process then forms the desired cross-sectional shape for the radius filler using a shape forming system (operation 1402), with the process terminating thereafter. The shape forming system may be implemented as a press or a pultrusion system in this illustrative example.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion or combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 15:
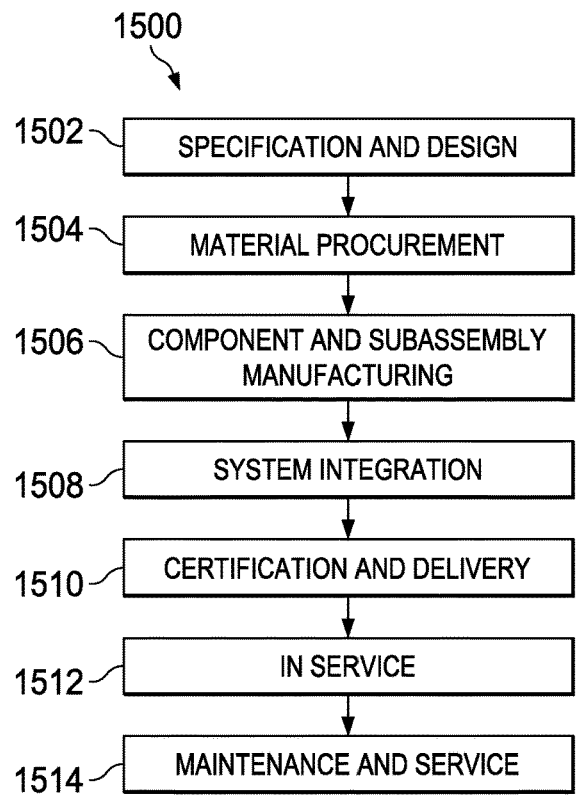
FIG. 15 is an illustration of an aircraft manufacturing and service method in the form of a block diagram in accordance with an illustrative embodiment.
Figure 16:
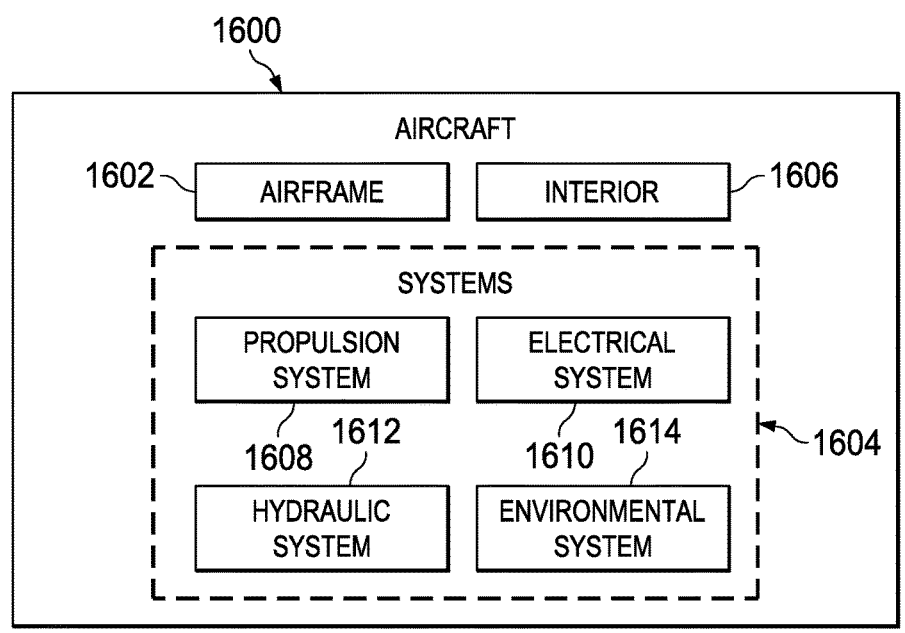
FIG. 16 is an illustration of an aircraft in the form of a block diagram in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in the form of a block diagram in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in the form of a block diagram in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In particular, radius filler 1004 from FIG. 10 may be installed in a composite part in aircraft 1600 during any one of the stages of aircraft manufacturing and service method 1500. For example, a composite part may be manufactured in accordance with an illustrative embodiment during component and subassembly manufacturing 1506, during maintenance and service 1514, or some other time. For example, a composite part may be manufactured during specification and design 1502 is a prototype for testing to determine whether particular design is a desired design for a composite part.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or a combination thereof. The use of a number of the different illustrative embodiments may substantially expedite the assembly, reduce the cost of aircraft 1600, or both.

Thus, the illustrative embodiments provide a method and apparatus for manufacturing radius filler 1004. Specifically, the illustrative embodiments provide a method to inductively cure radius filler 1004 while in position between plurality of composite structures 1019. Radius filler 1004 is formed having desired cross-sectional shape 1054. Radius filler 1004 has composite material 1023 and number of heating elements 1029 located within composite material 1023. The shaped radius filler 1004 is positioned in channel 1022 formed by plurality of composite structures 1019. Radius filler 1004 is inductively heated by inducing current 1051 within number of heating elements 1029. Heat 1052 generated by number of heating elements 1029 cures radius filler 1004 prior to curing plurality of composite structures 1019.

With the use of an illustrative embodiment, thermal induced stresses within the radius filler, due to co-curing the radius filler with the surrounding lamina, may be reduced or eliminated. Since the radius filler is inductively cured before curing the surrounding lamina, restrictive forces are not applied to the radius filler by the surrounding lamina. As a result, thermal induced stresses, as well as cracking from those stresses, may be reduced. As a result, desired structural performance of the radius filler may be achieved.

Localized curing of the radius filler is performed without adding complexity to the manufacturing process. Since the radius filler is cured in-situ, movement and reconfiguration of the radius filler is not needed. Moreover, induction heating is a more efficient process than some currently used pre-cure methods for radius fillers. As a result, some cost savings may be realized.

The use of an illustrative embodiment also achieves a more uniform cure of the radius filler. Both the parameters of the heating elements and the parameters of the heater may be precisely controlled. This dual level of control leads to a more uniform cure as compared to some currently used systems that cure from the outside of the filler to the inside of the filler. This uniformity may enhance the structural performance of the radius filler, the usable life of the radius filler, or both.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    positioning a radius filler in a channel formed by a plurality of composite structures, wherein the radius filler has a desired cross-sectional shape, and wherein the radius filler has a composite material and a number of heating elements located within the composite material;
    curing the radius filler in the channel by inductively heating the radius filler, wherein the radius filler is inductively heated by inducing a current within the number of heating elements; and
    cooling the radius filler down to a desired temperature after curing the radius filler and before curing the plurality of composite structures.

2. The method of claim 1 further comprising:
    selecting a size, a shape, and a position for each of a number of heating elements to provide a desired curing speed for the radius filler, wherein a distance between the number of heating elements facilitates the desired curing speed by enabling a uniform distribution of heat throughout the radius filler.

3. The method of claim 1, wherein the number of heating elements are comprised of a material selected from at least one of stainless steel, nickel, a metalized film, a ceramic, aluminum, or copper.

4. The method of claim 1, wherein inductively heating the radius filler comprises:
    cycling on and off the current to produce a desired temperature profile within the radius filler.

5. The method of claim 1, wherein inductively heating the radius filler comprises:
    receiving thermal feedback from a sensor system; and
    cycling on and off an input of the current based on the thermal feedback to produce a desired temperature profile within the radius filler.

6. The method of claim 1 further comprising:
    forming the radius filler, wherein forming the radius filler includes using a shape forming system to transform the radius filler into a shape having the desired cross-sectional shape.

7. The method of claim 1, wherein the number of heating elements includes a susceptor core, and wherein forming the radius filler comprises:
    placing the susceptor core within an interior of the radius filler, wherein the susceptor core is oriented along a central axis of the radius filler.

8. The method of claim 1 further comprising:

placing a vacuum bag over the radius filler and the plurality of composite structures before curing the radius filler; and applying a vacuum to the radius filler and the plurality of composite structures using a vacuum source while inductively heating the radius filler.

9. The method of claim 1, wherein inductively heating the radius filler to cure the radius filler prior to curing the plurality of composite structures reduces at least one of a thermal induced stress or cracking within the radius filler.

10. The method of claim 1 further comprising forming the radius filler, wherein forming the radius filler comprises:
laying up a number of layers of the composite material;
placing the number of heating elements on the number of layers of composite material, wherein the number of heating elements comprises deformable segments of material; and
forming the radius filler to have the desired cross-sectional shape with the number of heating elements are located within the radius filler using a shape forming system.

11. An apparatus comprising:
a plurality of composite structures; and
a radius filler having a desired cross-sectional shape, wherein the radius filler has a composite material and a number of heating elements located within the composite material, wherein the radius filler has been cured by inductively heating the number of heating elements within the radius filler, wherein the radius filler is positioned in a channel formed by the plurality of composite structures, and wherein the radius filler is cooled down to a desired temperature after curing the radius filler and before curing the plurality of composite structures such that thermal cure induced stresses are reduced in the radius filler compared to a second radius filler having the desired cross-sectional shape and cured within a channel formed by a second plurality of composite structures at a same time as curing the second plurality of composite structures.

12. The apparatus of claim 11, wherein the number of heating elements comprises at least one of stainless steel, nickel, a metalized film, a ceramic, aluminum, or copper.

13. The apparatus of claim 12, wherein the number of heating elements comprises at least one of deformable segments of material or a susceptor core.

14. A method for manufacturing an aircraft structure having a radius filler, the method comprising:
positioning a plurality of composite structures relative to one another such that a channel is formed between the plurality of composite structures;
selecting a size, a shape, and a position for each of a number of heating elements to provide a desired curing speed for the radius filler;
forming the radius filler by placing the number of heating elements at a distance from each other on a composite material, the distance facilitating the desired curing speed;
positioning the radius filler in the channel formed by the plurality of composite structures;
inductively heating the radius filler by inducing a current within the number of heating elements to thereby cure the radius filler; and
curing the plurality of composite structures around the radius filler to form the aircraft structure, wherein the radius filler is cured and subsequently cooled to a desired temperature prior to curing the plurality of composite structures.

15. The method of claim 14 further comprising:
placing a vacuum bag over the radius filler and the plurality of composite structures before curing the radius filler; and
applying a vacuum to the radius filler and the plurality of composite structures using a vacuum source while curing the radius filler and while curing the plurality of composite structures.

16. The method of claim 14, wherein forming the radius filler comprises:
laying up a number of layers of composite material;
placing the number of heating elements on the number of layers of composite material; and
forming the radius filler to have a desired cross-sectional shape with the number of heating elements located within the radius filler using a shape forming system.

17. The method of claim 14, wherein forming the radius filler comprises:
placing a susceptor core within an interior of the radius filler, wherein the number of heating elements is oriented along a central axis of the radius filler; and
forming a desired cross-sectional shape for the radius filler using a shape forming system.

18. The method of claim 14, wherein the desired temperature is room temperature.

19. A method of reducing thermal induced stresses in a first part, the first part being designed to be at a location that is in close proximity to a second part, wherein both the first part and the second part are to be cured and wherein the thermal induced stresses would be induced into the first part while the first part and the second part are being cured, the method comprising:
determining a number of heating elements to use to inductively cure the first part and a distance to place the determined number of heating elements from each other within the first part such that a uniform curing temperature is achieved within the first part while the first part is being cured;
placing the determined number of heating elements at the determined distance from each other within the first part;
positioning the first part at the location;
curing the first part by inducing a current within the determined number of heating elements to heat up the first part to the uniform curing temperature; and
cooling the first part down to room temperature after curing the first part and before curing the second part to reduce the thermal induced stresses in the first part.

20. The method of claim 19, wherein the number of heating elements and the distance of the determined number of heating elements from each other are further determined to enable a desired curing speed.

21. The method of claim 20, wherein the determined number of heating elements are malleable.

22. The method of claim 21, wherein the location includes a channel within the second part.

23. The method of claim 22, wherein positioning the first part at the location includes transforming the first part into a shape having a desired cross-section using a shape forming system, the desired cross-section facilitating positioning the first part within the channel.

24. The method of claim 23, wherein a vacuum is applied to the first part and the second part using a vacuum source while inductively heating the first part.

25. The method of claim 24, wherein the first part includes a radius filler and the second part includes a plurality of composite structures.

26. The method of claim 1, wherein the desired temperature is room temperature.

* * * * *